No. 787,013. PATENTED APR. 11, 1905.
H. T. TWEEDT.
STEEL TRAP.
APPLICATION FILED JULY 25, 1904.

Witnesses
L. Armstrong
W. C. O. Keyes

Inventor
H. T. Tweedt,
by Chandler & Chandler
Attorneys

No. 787,013. Patented April 11, 1905.

UNITED STATES PATENT OFFICE.

HARRY T. TWEEDT, OF SLATER, IOWA.

STEEL TRAP.

SPECIFICATION forming part of Letters Patent No. 787,013, dated April 11, 1905.

Application filed July 25, 1904. Serial No. 218,084.

*To all whom it may concern:*

Be it known that I, HARRY T. TWEEDT, a citizen of the United States, residing at Slater, in the county of Story, State of Iowa, have invented certain new and useful Improvements in Steel Traps; and I do hereby declare the following to be a full, clear, and exact description of the invention, such as will enable others skilled in the art to which it appertains to make and use the same.

This invention relates to traps, and more particularly to steel traps, and has for its object to provide a trap of this class which will be provided with two sets of jaws, a single pair of springs and a single retaining device sufficing for both sets of jaws.

Another object is to provide a trap embodying these features which may be manufactured at a low figure.

Other objects and advantages will be apparent from the following description, and it will be understood that any suitable materials may be used and that changes may be made in the specific construction shown and described without departing from the spirit of the invention.

Figure 1:
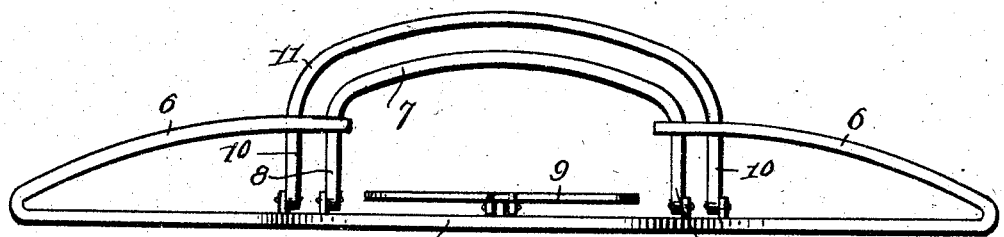
Figure 2:
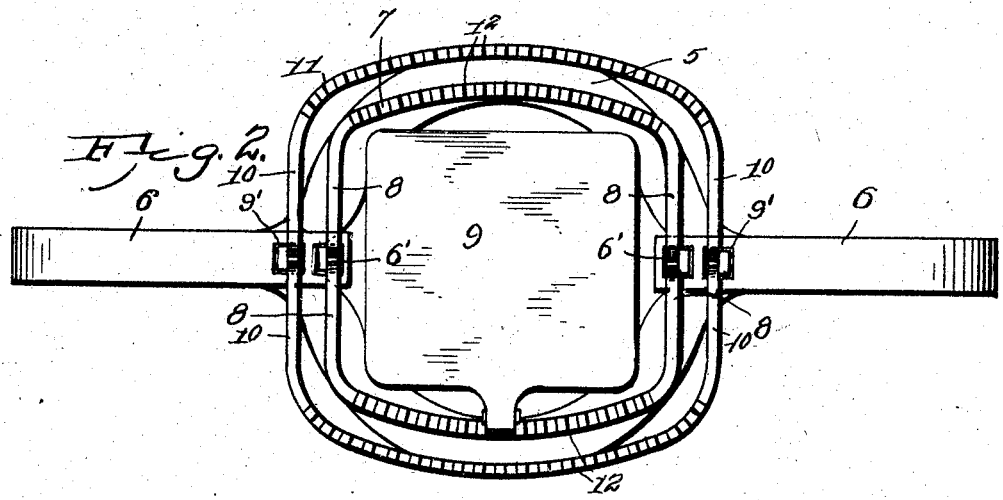
Figure 3:
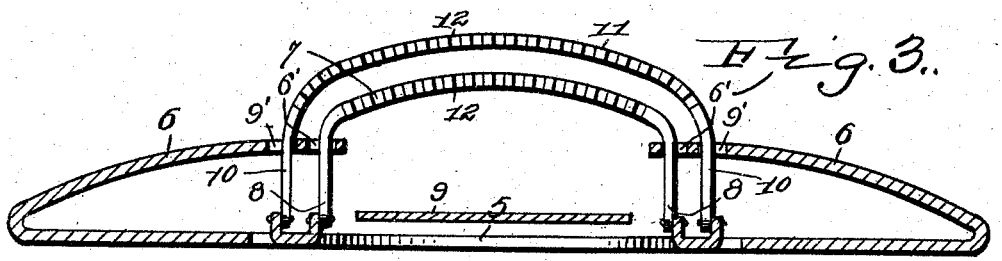

In the drawings forming a portion of this specification, and in which like numerals of reference indicate similar parts in the several views, Figure 1 is a side elevation of the trap closed. Fig. 2 is a top plan view of the trap set. Fig. 3 is a sectional view of the trap closed and showing the jaws in elevation.

Referring now to the drawings, there is shown a steel trap, including the usual base-plate 5, having its ends turned upwardly and inwardly upon itself to form actuating-springs 6 for the jaws 7 of the trap, which are pivoted to the base-plate in the usual manner, the springs 6 having openings 6' at their ends with which the spaced legs 8 of the jaws are engaged. The operation of this form of trap is too generally known to need a detailed description. The springs 6 are depressed to permit of separation of the jaws, which are held in this position by a trip-plate 9, which is engaged therewith. In the present invention the springs 6 are provided with perforations 9' adjacent to their perforations 6', and located between the latter perforations and the outer ends of the springs and engaged in the perforations 9' are the spaced legs 10 of a second pair of jaws 11, which are also actuated by the springs 6, as will be readily understood. The jaws 11 inclose the jaws 7 and lie when closed above these jaws, so that the two sets of jaws grasp the leg of an animal stepping upon the trip-plate. The coöperating edges of the jaws 11 are provided with interlocking teeth 12 to insure a tight grip upon the leg of the victim. It will of course be understood that when the springs are depressed the jaws 11 may be separated and will lie in such position until the springs are released.

What is claimed is—

A steel trap comprising a plate having its ends bent upwardly and inwardly to form spring-tongues, said tongues each having a plurality of perforations at its free end, and a plurality of pairs of U-shaped jaws pivoted to the plate and having their legs engaged in the perforations of the tongues.

In testimony whereof I affix my signature in presence of two witnesses.

HARRY T. TWEEDT.

Witnesses:
 HENRY DOBBIE,
 MARTIN DOBBIE.